(12) United States Patent
Riviere-Huc et al.

(10) Patent No.: US 7,560,087 B2
(45) Date of Patent: Jul. 14, 2009

(54) METHOD FOR STABILISATION OF METALLIC MERCURY USING SULPHUR

(75) Inventors: Christelle Riviere-Huc, Gif-sur-Yvette (FR); Vincent Huc, Gif-sur-Yvette (FR); Emilie Bosse, Cergy le Haut (FR)

(73) Assignees: STMI Societe des Techniques en Milieu Ionisant, Gif sur Yvette (FR); Universite Paris sud (Paris XI), Orsay (FR); Centre National de la Recherche Scientifique, Paris (FR)

( * ) Notice: Subject to any disclaimer, the term of this patent is extended or adjusted under 35 U.S.C. 154(b) by 288 days.

(21) Appl. No.: 11/597,751

(22) PCT Filed: Jun. 1, 2005

(86) PCT No.: PCT/FR2005/050402

§ 371 (c)(1),
(2), (4) Date: Nov. 28, 2006

(87) PCT Pub. No.: WO2006/016076

PCT Pub. Date: Feb. 16, 2006

(65) Prior Publication Data

US 2008/0019900 A1  Jan. 24, 2008

(30) Foreign Application Priority Data

Jun. 3, 2004  (FR) .................................. 04 51103

(51) Int. Cl.
*C01G 13/00* (2006.01)
*B01D 3/00* (2006.01)

(52) U.S. Cl. ...................... 423/566.1; 202/175; 62/499; 588/15; 423/101

(58) Field of Classification Search .............. 423/566.1, 423/101; 202/175; 62/499; 588/15
See application file for complete search history.

(56) References Cited

OTHER PUBLICATIONS

Robin Stewart, et al. "Stabilization of Radioactively Contaminated Elemental Mercury Wastes", Denver, Sep. 13-18, 1998, vol. 3, pp. 33-36.
By Lawrence N. Oji "Mercury Disposal via Sulfur Reactions", Journal of Environmental Engineering, Oct. 1998, pp. 945-952.

*Primary Examiner*—John P. Sheehan
*Assistant Examiner*—Rebecca Lee
(74) *Attorney, Agent, or Firm*—Oblon, Spivak, McClelland, Maier & Neustadt, P.C.

(57) ABSTRACT

Process for the stabilization of mercury metal by reaction of the mercury metal with sulphur in the solid state, in which the mercury and the sulphur are brought into contact, at an Hg/S molar ratio of 1/1 to 1/3, in a reactor integral with a hollow pipe in fluid communication with the interior space of the said reactor, the said hollow pipe comprising a first end connected to the wall of the said reactor and a second end distant from the said reactor; the said hollow pipe and the said reactor being hermetically sealed, the said hollow pipe being provided with rotating means external to the said pipe and to the said reactor for rotating the said reactor and the said pipe around the axis of the said pipe, and the said hollow pipe being provided, at its end distant from the reactor, with means for introducing the sulphur and the mercury inside the reactor and discharging the reaction products.

20 Claims, 1 Drawing Sheet

METHOD FOR STABILISATION OF METALLIC MERCURY USING SULPHUR

Figure 1:
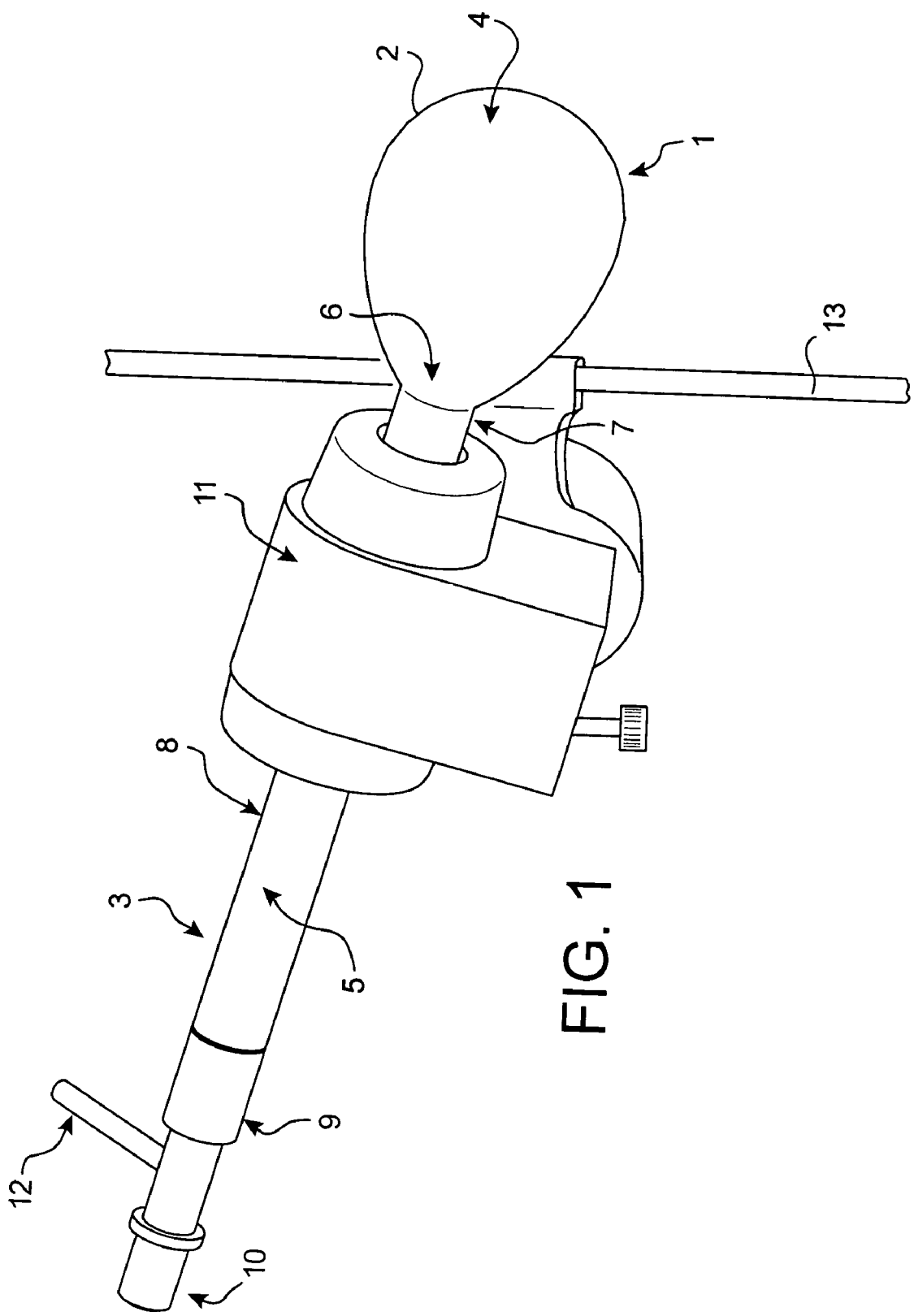

The invention relates to a process for the stabilization of mercury metal with sulphur.

The process applies in particular to the stabilization of mercury contaminated by radioelements.

The technical field of the invention may be defined as that of the treatment of mercury-based waste for the purpose of its storage or of its removal.

Direct storage or incineration is impossible because of the undesirable and toxic mercury vapours.

For this reason, processes targeted at reducing the mobility of mercury in the environment have already been employed.

These immobilization processes are targeted essentially at preventing the mercury from being released into the atmosphere, by volatilization, and into the soil, by leaching.

The immobilization processes are encapsulation, amalgamation and stabilization.

Encapsulation is the physical immobilization of the dangerous elements by enveloping the waste in a non-porous and impermeable matrix to prevent the release of the mercury vapours and to also prevent the leaching of the mercury.

The known encapsulation processes are the use of cements based on sulphur polymers or phosphate ceramics. Polyethylene, polyesters, polysiloxane and others can also be used. These processes can include a stage of chemical stabilization of the mercury.

Thus, the document U.S. Pat. No. 6,399,849 B1 from Brookhaven National Laboratory discloses the use of a cement based on sulphur polymers for treating mercury. This process takes place in two stages:

the polysulphides of the sulphur polymer convert the mercury to mercury sulphide (HgS);

the waste HgS formed is solidified in the cement.

Amalgamation is the physical immobilization of the mercury with another metal to form a semi-solid alloy or amalgam.

Mercury amalgamates with virtually all metals but more particularly with copper, nickel, tin, zinc, gold or silver. The problem of this technique is that it does not significantly reduce the leaching and the volatilization of the mercury. This process thus has to be followed by an encapsulation stage.

Stabilization is the chemical immobilization by combination with immobile entities in order to reduce the release of the dangerous elements in the atmosphere or the biosphere. The process which forms the subject-matter of the invention belongs more particularly to this type of process for the treatment of mercury.

The commonest stabilization of mercury metal in the literature is that with sulphur, although this technique is commonly defined as an amalgamation technique in the patents of which it forms the subject-matter. This term appears to be unsuitable because a reaction clearly takes place between the mercury and the sulphur, which has to be described as "stabilization".

A highly water-insoluble (0.0125 mg/l) mercury sulphide or metacinnabar is thus formed, which is converted to red sulphide or cinnabar by heating (at a temperature of 386° C.).

In the case of mercury in the +II oxidation state, stabilization is obtained by precipitation with sodium sulphide or hydrogen sulphide or with trimercapto-s-triazine.

The disadvantage of these techniques is the need for pre-oxidation of the mercury to the +II oxidation state in aqueous solution.

It is thus preferable to use, when it is desired to treat elemental mercury metal, as is the case in the present document, the technique of stabilization between elemental mercury and solid sulphur according to the following reaction:

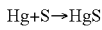

The document U.S. Pat. No. 5,034,054 discloses a process in which mercury metal is mixed with an inorganic powder which results in permanent bonding of the mercury to the powder in the solid form. The "amalgam" obtained can be easily and without risk stored in a landfill site.

The inorganic powder is chosen from powders formed of transition metals which are reactive with mercury, and sulphur powder.

The sulphur powder is added to the mercury in an S:Hg ratio of at least 1:1 and preferably of the order of at least 3:1, by weight.

The inorganic powder and the mercury are preferably placed in a disposable container and are subjected to nonintrusive stirring.

The container with the amalgam is subsequently stored in a landfill site.

The nonintrusive stirring is carried out by placing the disposable container in a device of the paint mixer type which produces stirring along three axes.

It is mentioned that other types of nonintrusive stirring might possibly give good results, without further details.

The devices used in this document are not hermetic.

The document by R. Stewart et al., "Proceedings of the International Conference on Decommissioning and Decontamination and on Nuclear and Hazardous Waste Management", Denver, 13-18 Sep. 1998, volume 3, pages 33-36, reports the results obtained during tests "on amalgamation" of mercury with- sulphur. Liquid mercury is stabilized with sulphur in the form of powder in a commercial mill mixer. The addition of mercury takes place in a controlled way onto the sulphur.

The temperature of the mixture is measured continuously and samples are analysed periodically in order to determine the amount of free mercury. The reaction is carried out at ambient temperature.

The processes described in the two abovementioned documents involve the following reaction:

In the processes of these two documents, the sulphur is added in a large excess with respect to the mercury, namely with an Hg/S ratio of 1/1 to 1/3 by weight (which corresponds to an Hg/S molar ratio of 1/6.5 to 1/19). The consequence of this large excess of sulphur is the formation of a very large volume of HgS and sulphur product.

In addition, the processes of these two documents do not guarantee the absence of mercury vapours in the area where the reaction is being carried out and specific protection of personnel and/or ventilation are therefore necessary in carrying out these processes.

The document by Lawrence N. Oji, "Mercury Disposal via Sulfur Reactions", Journal of Environmental Engineering, October 1998, pages 945-952, relates to the treatment of mercury, in particular of radioactive mercury, with sulphur for the purpose of the storage thereof.

Elemental mercury is converted to its sulphides by mixing the mercury with sulphur powder in a high shear mixer with stirrer blade speeds of up to 19 000 revolutions/min or in a reactor with blade speeds of at least 1000 revolutions/min.

HgS is thus prepared in the α and β crystalline forms (cinnabar and metacinnabar); the reactor makes possible only the production of black mercuric sulphide (metacinnabar), whereas the high shear mixer makes it possible to prepare equally well black mercuric sulphide as red mercuric sulphide.

It is necessary, with the high shear mixer, to continuously maintain cooling and inert atmosphere conditions to prevent the danger of combustion of the sulphur and of fire from increasing. With the reactor, it is only possible to obtain black mercuric sulphide because of the limited rotational speed of the blades, the fixed volume of air and the circulation of cooling water in the reactor.

The conditions for carrying out the process described in the document by Oji are extreme conditions; this is because it requires systems for rendering inert, for cooling with water and for measuring the temperature. It also requires a safety valve and continuous monitoring of the rise in temperature and in pressure of the system. In addition to the conditions for carrying out the process, another disadvantage of the latter is the impossibility of extracting tritium oxide or tritiated water.

It emerges from the above that there exists a need for a process for the stabilization of mercury metal by reaction of mercury metal with sulphur in the solid state which is simple, easy to carry out, reliable, safe, of short duration and inexpensive and which provides a high reaction yield.

There exists in particular a need for such a process which provides highly effective protection of the personnel carrying out the said process without having recourse to complex devices.

There also exists a need for a process which generates a reduced volume of final mercury sulphide HgS product in order to reduce the handling, intermediate storage and storage costs of such a product.

This final product should exhibit the lowest possible sensitivity to leaching tests and should improve the results obtained in this field with the processes of the prior art.

In the specific case of radioactive mercury, the process should make it possible to reduce the contamination of the mercury sulphide formed after stabilization.

The aim of the present invention is to provide a process for the stabilization of mercury metal by reaction of the mercury metal with sulphur in the solid state which meets, inter alia, the needs listed above and which satisfies the requirements and criteria mentioned above.

This aim and yet others are achieved, in accordance with the present invention, by a process for the stabilization of mercury metal by reaction of the mercury metal with sulphur in the solid state, in which the mercury and the sulphur are brought into contact, at an Hg/S molar ratio of 1/1 to 1/3, in a reactor integral with a hollow pipe in fluid communication with the interior space of the said reactor, the said hollow pipe comprising a first end connected to the wall of the said reactor and a second end distant from the said reactor; the said hollow pipe and the said reactor being hermetically sealed, the said hollow pipe being provided with rotating means external to the said pipe and to the said reactor for rotating the said reactor and the said pipe around the axis of the said pipe, and the said hollow pipe being provided, at its end distant from the reactor, with means for introducing the sulphur and the mercury inside the reactor and discharging the reaction products.

The process according to the invention is defined by a combination of specific characteristics.

It should first of all be noted that the process according to the invention employs mercury metal and sulphur in the solid state and not an aqueous solution of Hg(II) which requires, for its preparation, a preliminary oxidation of the mercury.

The process according to the invention generates a smaller volume of product than in the prior art.

The process according to the invention employs a specific Hg/S molar ratio of 1/1 to 1/3, which corresponds to a weight ratio of 1/0.16 to 1/0.48. Such a molar ratio makes it possible to reduce the volume of product formed by a factor of between 4 and 12, depending on the stoichiometry, with respect to the processes of the prior art, such as that disclosed in the document U.S. Pat. No. 5,034,054.

The process according to the invention is carried out in a specific reactor which is firmly attached to (integral with) a hollow pipe in fluid communication with the interior space of the said reactor.

The said hollow pipe is provided with rotating means external to the said pipe and to the said reactor for rotating the said reactor and the said pipe around the axis of the said pipe.

This reactor, which incorporates a pipe acting as a hollow stirring pipe to which it is firmly attached (integral), is very simple.

Stirring is of the nonintrusive type. It is rotational stirring involving rotating means, such as a motor, which are external to the pipe and to the reactor and which are completely independent of these. These means, unlike intrusive stirring systems, are thus not contaminated by the reactants and do not have to be changed between each treatment batch, thus increasing the volume of the waste generated.

No heating is brought about by the rotational stirring of the invention, in contrast to the stirring system used in the document by Oji, which produces a great deal of heat and which requires rendering inert and the presence of a cooling system.

In addition, it should be noted that the stirring employed according to the invention does not require complex means for rendering leaktight at the point where the stirrer passes through the wall of the reactor as the stirring is generated by means entirely external to the reactor.

The rotational stirring according to the invention is much easier to carry out than the stirring according to three axes disclosed in the document U.S. Pat. No. 5,034,054 and is more efficient.

Due to the specific structure of the reactor employed in the process of the invention and the external rotational means with which it is provided, the reactor can easily be equipped with means for introducing or charging the reactants, namely the sulphur and the mercury, inside the reactor and removing or discharging the product resulting from the reaction, namely HgS, as complete reaction occurs between the sulphur and the mercury.

These means are provided at the end of the hollow pipe distant from the reactor. It is not necessary to disconnect the stirring system and the reactor in order to introduce or remove the reactants and products from the latter as the charging/discharging is carried out via the hollow stirring pipe or shaft which is firmly attached to the reactor and which is formed as one piece with the latter. The charging/discharging can be manual or automatic and is greatly simplified in comparison with the processes of the prior art.

The reactor and the pipe are hermetically sealed, which ensures, in contrast to the devices of the prior art, completely safe operation of the process, both for the environment and for the personnel.

The hermetically sealed reactor and pipe make it possible to isolate the personnel from the mercury vapours and to prevent recourse having to be had to a ventilation system.

Advantageously, the reactor is an essentially spherical reactor. Such a reactor is generally described as a "round-bottomed" reactor ("ball").

Advantageously, the reactor is equipped with heating means and/or with cooling means. Heating makes it possible to accelerate the reaction of the mercury with the sulphur.

The reaction is generally carried out at a temperature of 20 to 100° C., preferably of 60 to 80° C., at atmospheric pressure.

The main axis of the pipe can be coincident with the axis of the reactor. Stirring is thus produced by symmetrical rotation around this axis.

The main axis of the pipe can also be offset with respect to the axis of the reactor.

The process according to the invention applies to the treatment of mercury metal.

The mercury employed in the process according to the invention can be mercury contaminated by volatile and/or nonvolatile, for example solid, impurities or contaminants.

It should be noted that large amounts of mercury metal and of solid mercury waste are present on nuclear sites, for example in France.

The process according to the invention applies very particularly to the treatment of mercury contaminated by radioelements, the nature and the content of which in the mercury can vary. They may be volatile radioelements, for example tritium in the form of tritiated water, or heavy nonvolatile radioelements, for example plutonium and/or uranium in the form of oxides.

The process according to the invention can also be used for mercury-comprising solid waste.

Prior to the reaction with the sulphur, the mercury (alone) can be distilled in the case where the latter is contaminated or is present in solid waste.

This distillation proves to be particularly useful in the case where the mercury is mercury contaminated by radioelements as it makes it possible to reduce the radiological contamination of the mercury sulphide (HgS) formed after stabilization.

In the case where the mercury is contaminated by volatile contaminants, this distillation, which is carried out on the mercury alone before any contact with the sulphur, can be carried out at a moderate temperature, namely at a temperature generally from 90 to 120° C., at atmospheric pressure.

In this case, it is thus essentially the volatile contaminants present in the mercury, such as water, for example tritiated water, which are removed.

This distillation is preferably carried out in the same reactor where the reaction takes place before introduction of the sulphur into the said reactor to form HgS.

In order to carry out this distillation at moderate temperature, distillation means are provided on the said hollow pipe.

In the case where the mercury is contaminated by "heavy" nonvolatile contaminants or is present in solid waste, this distillation can be carried out at a high temperature, namely, for example, of 360° C., at atmospheric pressure, by means of which it is then the mercury which is distilled and which is collected in a recovery receiver (round-bottomed receiver). The nonvolatile impurities or contaminants, such as the oxides of the heavy elements Pu and U, remain in the reactor where the distillation has taken place and are recovered. The mercury is thus isolated from the "clean" solid waste.

The reaction between the mercury and the sulphur can then be carried out, in accordance with the process according to the invention, in the receiver, such as a round-bottomed receiver, where the distilled mercury has been collected and where it is present, the said receiver then acting as the reactor used in the process.

In the case where the volatile contaminants or the mercury are distilled, the distillation temperatures can be greatly lowered by reducing the pressure inside the receiver where the distillation takes place, for example the reactor, to a pressure below atmospheric pressure, for example by addition of a vacuum pump.

The reactor used according to the invention, which is hermetically sealed, actually makes it possible to operate in that way and to carry out a distillation under reduced pressure (with respect to atmospheric pressure).

The invention will be better understood on reading the description which will follow, given by way of illustration and without implied limitation, with reference to the appended drawing, in which:

FIG. 1 is a diagrammatic view in partial cross section of a reactor for the implementation of the process according to the invention.

In FIG. 1, a reactor as used to carry out the process of the invention has been represented. The reactor (1) as such comprises a chamber, preferably an essentially spherical chamber, the wall (2) of which is made of a material which is inert with respect to the reactants, namely with respect to sulphur and mercury metal, for example glass.

This generally spherical chamber is firmly attached to a hollow pipe (3) with a generally circular cross section. The interior space (4) of the reactor (1) and the interior space (5) of the pipe are in fluid communication via an orifice (6), generally a circular orifice, made in the wall (2) of the reactor. The said pipe (3) comprises a first end (7) connected to the wall (2) of the reactor (1) where the walls (8) of the said pipe and the wall (2) of the reactor (1) meet and a second end (9) distant from the reactor.

The wall (2) of the reactor and the walls (8) of the pipe can be formed as one piece; alternatively, the connection can be made via a conventional ground joint.

Means for introducing the reactants into the reactor and/or removing the reaction products from the reactor are provided at the end (9) of the hollow pipe distant from the reactor.

These means generally comprise a sealing valve (10) which makes it possible to hermetically seal the combined reactor (1) and pipe (3).

The reactor and the pipe are sealed (airtight). In other words, all the components in contact with the mercury or liable to be in contact with the latter are confined.

The reactor is equipped with rotating means which are, according to the invention, means external to the said pipe and to the said reactor, that is to say means independent of the reactor part.

These means also comprise a motor (11) and a system of gears (not visible in the drawing) intended to impart rotational movement to the combined reactor and pipe.

The device according to the invention can also comprise distillation means. These distillation means generally comprise a condenser (vertical column) which is attached, for example by screwing, to the hollow pipe. This column is thus different from the hollow pipe firmly attached to the reactor.

Alternatively, it is possible to provide a recovery round-bottomed receiver for recovering the mercury with a cold trap, in the case where a preliminary distillation of the mercury is carried out at a high temperature, for example at 360° C.

The recovered mercury, with the sulphur, then reacts in the said recovery round-bottomed receiver in accordance with the process of the invention or else the mercury is transferred into another reactor, for example a round-bottomed reactor, in which it reacts with the sulphur in accordance with the process of the invention.

The said condensers or recovery round-bottomed receivers are generally connected to the hollow pipe via an additional connection (12) equipped, for example, with a threaded joint, as indicated above.

The reactor can also comprise additional heating means (not represented), for example in the form of an electrical system surrounding the reactor.

The reactor can also comprise cooling means, for example in the form of a bath of ice-cold water or of a container filled with ice surrounding the reactor.

In the case of treatment of mercury with sulphur, these cooling means are not used.

Means for placing under vacuum can be added via the additional connection (12) generally present at the end of the hollow pipe most distant from the reactor.

In FIG. 1, the device comprising the reactor, the hollow pipe, the motor and the gearings, and the like, is attached to a fixing rod (13) but other fixing means can obviously be used.

The invention will now be described with reference to the following examples, given by way of illustration and without implied limitation:

EXAMPLES

In the examples which follow, the process according to the invention is carried out with nonintrusive stirring. The arrangement used corresponds substantially to that described in FIG. 1, with the reactor having the form of a round-bottomed reactor with a volume of 50 ml, 100 ml, 250 ml or 2000 ml and heating means composed of electrical heating systems surrounding the round-bottomed reactor.

Examples 1 to 5 are carried out on the laboratory scale (with an initial weight of mercury of approximately 55 g). In Example 7, the reaction is carried out on the semi-pilot scale with a weight of mercury of approximately 1 kg. In Example 6, the influence of the stirring speed is studied on the laboratory scale and on the semi-pilot scale.

In Example 8, the analyses of the finished product and of the eluate resulting from the leaching of the finished product are reported.

In Example 9, the results of the analyses described in Example 8 are compared with the regulatory criteria for acceptance into storage.

Example 1

In this example, the influence of the S/Hg stoichiometry on the reaction is studied.

A first experiment consisted in reacting sulphur and mercury in an S/Hg molar ratio of 1.5 in a 100 ml reactor at a rotational speed of 50 revolutions/min at ambient temperature.

After stirring for 24 h, a gaseous mercury measurement indicates that the reaction is not complete. This is because the Hg(g) content is greater than 2000 $\mu g/m^3$. This experiment is thus halted.

A second experiment was carried out with an S/Hg molar ratio of 3 in a 100 ml reactor at a rotational speed of 50 revolutions/min at ambient temperature. The same observation is made as above after stirring for 24 h.

These two experiments show that the rate of reaction between the mercury and sulphur is slow at ambient temperature. The timescale for observation of the experiments is not sufficient to show any influence of the stoichiometry on the rate of the reaction at ambient temperature.

Example 2

In this example, the influence of the temperature of the reaction medium on the reaction is studied.

A series of experiments was carried out with an S/Hg molar ratio of 1 in a 50 ml reactor with a rotational speed of 50 revolutions/min and at temperatures of 40° C., 60° C. and 80° C.

After stirring for 24 h, a gaseous mercury measurement for each of the experiments is carried out. The results are as follows:

T=40° C.: Hg(g) content>2000 $\mu g/m^3$

T=60° C.: Hg(g) content=1500 $\mu g/m^3$

T=80° C.: Hg(g) content=70 $\mu g/m^3$

This series of experiments shows that the rate of the reaction between the mercury and the sulphur increases with the temperature.

Example 3

In this example, the influence of the free volume in the reactor on the reaction is studied.

A series of experiments made it possible to demonstrate that, for the same rotational speed of the reactor, the greater the diameter of the reactor, the more the mercury and the sulphur are plastered onto the walls, slowing down the kinetics of the reaction. This is because the centrifugal force increases with the diameter of the reactor.

Example 4

In this example, the influence of an indentation in the reactor on the reaction is studied.

Several experiments using a reactor possessing indentations, with different S/Hg molar ratios, made it possible to demonstrate an increase in the rate of the reaction between the sulphur and the mercury. This is because the indentations on the reactor fragment the mercury drop initially present in the reactor into small beads. This fragmentation facilitates the contact and the reaction between the mercury and the sulphur.

Example 5

In this example, the influence of the presence of grinding agents on the reaction is studied.

Experiments were carried out with an S/Hg molar ratio of 1 in a 50 ml reactor.

The grinding agents tested are Fontainebleau sand (9 g) and glass beads with a diameter of 5 mm. The introduction of grinding agents has the effect of compacting the sulphur and the mercury instead of fragmenting the reactants. This formation of aggregates greatly slows down the rate of reaction.

Example 6

In this example, the influence of the stirring rate of the reactor on the reaction is studied.

Several series of experiments on the laboratory scale (and on the semi-pilot scale) made it possible to demonstrate the influence of the stirring rate of the reactor on the kinetics of the reaction.

For example, on the laboratory scale, experiments were carried out with an S/Hg molar ratio of 3, with a weight of mercury of approximately 55 g, in a 100 ml reactor, at a temperature of 80° C., for stirring rates of the reactor of 200 revolutions/min and 60 revolutions/min.

After stirring for 24 h, a gaseous mercury measurement for each of the experiments is carried out. The results are as follows:

s=200 revolutions/min: Hg(g) content=550 µg/m$^3$ s=60 revolutions/min: Hg(g) content=120 µg/m$^3$ These experiments thus show that, when the rotational speed of the reactor is reduced, the kinetics of the reaction are faster. In the case where the rotational speed of the reactor is low, the centrifugal force is not sufficient to plaster the reactants against the walls of the reactor. Thus, the powder composed of the reactants falls back down in the round-bottomed reactor at each rotation of the reactor. The mixing between the mercury and the sulphur is thus very efficient.

Example 7

In this example, the reaction is carried out on the semi-pilot scale.

In the preceding examples (1 to 5 and, in part, 6), examples on the laboratory scale with a weight of mercury in the vicinity of 55 g were described.

In the example described below, the reactions are carried out on the semi-pilot scale, that is to say that the initial amount of mercury is of the order of 1 kg.

The object of the semi-pilot trials is to confirm, on the semi-pilot scale, the parameters determined on the laboratory scale. Two experiments were carried out:

Experiment 1

S/Hg=1.2 (initial weight of mercury=1 kg)

Volume of the reactor=2 l

Temperature=60° C.

Reactor with smooth walls

Rotational speed of the reactor=200 revolutions/min

Experiment 2

S/Hg=1.2 (initial weight of mercury=1 kg)

Volume of the reactor=2 l

Temperature=60° C.

Reactor with indentations

Rotational speed of the reactor=50 revolutions/min

In the case of Experiment 1, after stirring for 5 h, the gaseous mercury content is 200 µg/m$^3$. The finished product exists, in equivalent proportions, in the form of large (a few centimetres) dark-grey aggregates and of a fine powder dark-grey in colour. A few beads of mercury are still visible in the aggregates.

In the case of Experiment 2, after stirring for 2 h, the gaseous mercury content is 200 µg/m$^3$. The finished product exists in the form of a very finely divided black powder.

These two experiments make it possible to confirm the parameters of the reaction. The analyses on the finished products resulting from these two experiments (cf. Examples 8 and 9) are compatible with the criteria for acceptance set by legislation.

However, the addition of indentations to the reactor and the use of a rotational speed of the reactor of the order of 50 revolutions/min increase the kinetics of the reaction and reduce the particle size of the finished product. These experiments on the semi-pilot scale have thus made it possible to confirm the parameters for reaction between the sulphur and the mercury. The process is thus applicable on the industrial scale to amounts of the order of several kg of mercury.

Example 8

In this example, analysis of the finished product and of the eluate resulting from the leaching of the finished product is carried out.

The analyses carried out on the finished product are an X-ray diffraction analysis and a measurement of the dryness.

The finished product was subsequently subjected to a leaching test. The analyses carried out on the eluate, that is to say on the leaching solution, are a measurement of the pH and an analysis of the mercury content.

Analysis by X-ray Diffraction

A powder X-ray diffraction diagram for the samples formed of powder obtained in accordance with the process of the invention was produced. The Hg/S stoichiometry is 1.5. The peaks characteristic of metacinnabar HgS and of sulphur (added in excess) are present in the diagram. This analysis confirms that the reaction is complete and that the product formed is mercury sulphide.

Measurement of Dryness

Dryness measurements were carried out according to standard NF ISO 11465 on various samples of finished product obtained in accordance with the process of the invention, for Hg/S stoichiometries of 1.2. On average, the content by weight on a dry basis is 99.93% and the content by weight of water is 0.07%.

Leaching Test

Leaching tests were carried out according to standard NF EN 12457-2 on the finished products from Experiments 1 and 2 of Example 7 obtained in accordance with the process of the invention on the semi-pilot scale.

In the case of Experiment 1, the particle size of the finished product was reduced in accordance with the standard applied (95% by weight of the particles must have a size of less than 4 mm). The finished product resulting from Experiment 2 (very finely divided powder) was not subjected to particle size reduction.

After stirring for 24 h and separating by settling, the eluate is filtered through a 0.45 µm membrane filter according to the standard already mentioned.

The eluates resulting from the teachings of the finished products resulting from Experiments 1 and 2 are subsequently analysed separately.

Measurement of the pH of the Eluate

The pH measurements are carried out on the eluates resulting from the Teachings of the finished products from Experiments 1 and 2 according to standard NFT 90008. The results are as follows:

Eluate Experiment 1: pH=4.55

Eluate Experiment 2: pH=4.25

The acidity of the eluates can be explained by the presence of a slight excess of sulphur in the finished product (Hg/S=1.2).

Mercury Content of the Eluate

The measurements of mercury content in the eluates resulting from the Teachings of the finished products from Experiments 1 and 2 of Example 7 are carried out according to standard NF EN 1483. The ultrasound digestion method is used. After reducing with hydroxylamine hydrochloride and stannous chloride, the mercury is entrained by a gas stream at ambient temperature (cold vapours). This procedure is described in the abovementioned standard. The mercury content is subsequently calculated after measuring the absorbance of the mercury at a wavelength of 253.4 nm. The mercury contents in the eluates are as follows:

Eluate Experiment 1: mercury content of the eluate=0.74 mg/kg of finished product Eluate Experiment 2: mercury content of the eluate=0.46 mg/kg of finished product The mercury contents of the eluates are low, which confirms, that the mercury is well stabilized by the sulphur in agreement with the solubility product of mercury sulphide HgS of $10^{-54}$ mentioned in the literature. The presence of a few beads of mercury in the finished product from Experiment 1 does not to a disadvantageous extent increase the mercury content of the eluate with respect to Experiment 2. It would appear that, even if these few drops of mercury are observed in the finished product from Experiment 1, the mercury is sufficiently immobilized in the matrix for the effect of the leaching to be negligible.

Example 9

In this example, a study is carried out on whether the mercury sulphide obtained by the process according to the invention satisfies the regulatory criteria for acceptance into storage.

Mercury sulphide is a dangerous waste within the meaning of Decree No. 2002-540 of 18 Apr. 2002 relating to the classification of waste specifying how Article L.541-24 of the Law on the Environment should be enforced.

It can be accepted into storage if it observes the following thresholds:

4<pH<13: measurement carried out on the eluate Dryness>30%

Mercury content: Hg<2 mg/kg of dry stabilized waste.

The analyses carried out according to the standardized methods (cf. Example 8) show that the thresholds for acceptance into storage are observed. The mercury stabilized by the process of the invention is thus directly accepted on a storage site.

The invention claimed is:

1. A process for the stabilization of mercury metal by reacting the mercury metal with sulphur in the solid state, in which the mercury and the sulphur are brought into contact, at an Hg/S molar ratio of 1/1 to 1/3, in a reactor integral with a hollow pipe in fluid communication with the interior space of said reactor, said hollow pipe comprising a first end connected to the wall of said reactor and a second end distant from said reactor; said hollow pipe and said reactor being hermetically sealed, said hollow pipe being provided with rotating means external to said pipe and to said reactor for rotating said reactor and said pipe around the axis of said pipe, and said hollow pipe being provided, at its end distant from the reactor, with means for introducing the sulphur and the mercury inside the reactor and discharging the reaction products.

2. The process according to claim 1, wherein the reactor is an essentially spherical reactor.

3. The process according to claim 1, wherein the reactor is additionally equipped with heating means and/or with cooling means.

4. The process according to claim 1, wherein the reaction is carried out at a temperature of 20 to 100° C. at atmospheric pressure.

5. The process according to claim 1, wherein the main axis of said pipe is coincident with the axis of said reactor.

6. The process according to claim 1, wherein the main axis of said pipe is offset with respect to the axis of said reactor.

7. The process according to claim 1, wherein the mercury is mercury contaminated by volatile and/or nonvolatile contaminants.

8. The process according to claim 1, wherein the mercury is mercury contaminated by radioelements.

9. The process according to claim 1, wherein the mercury is present in solid waste.

10. The process according to claim 7, wherein, prior to the reaction with the sulphur, the mercury alone is distilled.

11. The process according to claim 10, wherein the mercury is contaminated by volatile contaminants and the distillation is carried out at a moderate temperature, at atmospheric pressure to remove essentially the volatile contaminants present in the mercury.

12. The process according to claim 11, wherein the distillation is carried out in the reactor before introduction of the sulphur into the reactor.

13. The process according to claim 12, wherein, in order to carry out the distillation, distillation means are provided on said hollow pipe.

14. The process according to claim 10, wherein the mercury is contaminated by nonvolatile contaminants and the distillation is carried out at a high temperature, at atmospheric pressure by means of which the mercury is distilled and is collected in a receiver, and the nonvolatile contaminants are recovered, wherein, either:

1) the receiver is the reactor; or
2) the receiver is not the reactor, and the mercury is transferred from the receiver to the reactor for reacting with the sulphur.

15. The process according to claim 14, wherein the receiver is the reactor, and wherein the reaction of the mercury with the sulphur is carried out in the receiver where the distilled mercury has been collected.

16. The process according to claim 10, wherein the distillation is carried out at a pressure below atmospheric pressure.

17. The process according to claim 4, wherein the reaction is carried out at a temperature of 60 to 80° C.

18. The process according to claim 11, wherein the distillation is carried out at a temperature of 90 to 120° C.

19. The process according to claim 14, wherein the distillation is carried out at 360° C.

20. The process according to claim 14, wherein the receiver is a round-bottomed receiver.

* * * * *